(12) United States Patent
Pao et al.

(10) Patent No.: US 6,481,757 B1
(45) Date of Patent: Nov. 19, 2002

(54) CORE SPRAY SYSTEM ATTACHMENT ASSEMBLIES

(75) Inventors: Hsueh-Wen Pao, Saratoga City, CA (US); Johnny T. Ma, San Jose, CA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/682,539

(22) Filed: Sep. 17, 2001

(51) Int. Cl.[7] .................. F16L 55/178; G21C 15/00
(52) U.S. Cl. .............. 285/125.1; 285/187; 376/282; 376/286
(58) Field of Search .............. 285/125.1, 187, 285/15, 123.6; 376/282, 286, 204, 463

(56) References Cited

U.S. PATENT DOCUMENTS

| | | | |
|---|---|---|---|
| 5,735,551 A | 4/1998 | Whitman et al. | |
| 5,737,380 A | 4/1998 | Deaver et al. | |
| 5,901,192 A | 5/1999 | Deaver et al. | |
| 5,947,529 A | 9/1999 | Jensen | |
| 6,000,731 A | 12/1999 | Charnley et al. | |
| 6,131,962 A | 10/2000 | Jensen et al. | |
| 6,195,892 B1 * | 3/2001 | Weems et al. | 29/402.11 |
| 6,201,847 B1 | 3/2001 | Jensen et al. | |
| 6,236,700 B1 * | 5/2001 | Erbes et al. | 285/15 |
| 6,390,509 B1 * | 5/2002 | Wivagg | 285/15 |
| 6,421,406 B1 * | 7/2002 | Jensen | 376/352 |

* cited by examiner

Primary Examiner—Eric K. Nicholson
(74) Attorney, Agent, or Firm—Armstrong Teasdale LLP

(57) ABSTRACT

A core spray sparger for use in a nuclear reactor pressure vessel. The core spray sparger includes a plurality of core spray lines, a coupling apparatus, a bracket assembly, and an end clamp assembly. The core spray line includes a core spray line end cap.

28 Claims, 6 Drawing Sheets

CORE SPRAY SYSTEM ATTACHMENT ASSEMBLIES

BACKGROUND OF INVENTION

This invention relates generally to nuclear reactors and more particularly, to assemblies for coupling core spray systems within such reactors.

A reactor pressure vessel (RPV) of a boiling water reactor (BWR) typically has a generally cylindrical shape and is closed at both ends, e.g., by a bottom head and a removable top head. A shroud typically surrounds the core and is supported by a shroud support structure.

Boiling water reactors have numerous piping systems, and such piping systems are utilized, for example, to transport water throughout the RPV. For example, the reactor is configured for a core spray system to deliver cooling water to the reactor core during a loss of coolant accident. The core spray system, including piping, downcomers, T-box assemblies, and core spray spargers, is used to deliver water from outside the RPV to inside the RPV. The core spray system provides water to the reactor core.

Stress corrosion cracking (SCC) is a known phenomenon occurring in reactor components exposed to high temperature water, such as structural members, piping, fasteners, and welds. The reactor components are subject to a variety of stresses associated with, for example, differences in thermal expansion, the operating pressure needed for the containment of the reactor cooling water, and other sources such as residual stresses from welding, cold working and other inhomogeneous metal treatments. In addition, water chemistry, welding, heat treatment, and radiation can increase the susceptibility of metal in a component to SCC.

Reactor internal piping, such as core spray spargers and T-box assemblies, occasionally requires replacement as a result of SCC or for other reasons. Replacing the spray spargers sometimes requires removing and replacing T-box assemblies, and core spray piping, including downcomers. Replacement of spray spargers, T-boxes, and downcomers is complicated by the limited working space, high radiation levels, and difficulties associated with welding to a highly radioactive shroud.

SUMMARY OF INVENTION

In one aspect, a coupling apparatus is provided for a core spray system in a nuclear reactor pressure vessel. The coupling apparatus includes a shroud, a T-box housing, a downcomer elbow, a spider, and a draw bolt. The shroud includes an inner surface, an outer surface, and a shroud opening extending between the inner surface and the outer surface. The T-box housing includes an inlet, a first outlet, a second outlet, and a bolt opening opposed the inlet. The downcomer elbow includes a first end and a second end, the first end having an interior portion and an exterior portion. The spider is attached to the downcomer elbow first end interior portion. The draw bolt extends through the T-box housing bolt opening, the T-box housing inlet, and the shroud opening to engage the spider. The draw bolt couples the T-box housing inlet to the shroud inner surface. The draw bolt also couples the downcomer elbow to the shroud outer surface.

In another aspect, a coupling apparatus is provided for a core spray system in a nuclear reactor pressure vessel. The coupling apparatus includes a shroud, a T-box housing, a downcomer elbow, and a plurality of draw bolts. The shroud includes an inner surface, an outer surface, a shroud opening extending between the inner surface and the outer surface, and a plurality of bolt openings adjacent the shroud opening. The T-box housing includes an inlet, a first outlet, a second outlet, a plurality of sidebrackets, and bolt openings in the sidebrackets. The downcomer elbow includes a mounting flange and a plurality of flange bolt receivers. The plurality of draw bolts extending through the T-box housing sidebrackets and the shroud bolt openings to engage the downcomer mounting flange bolt receivers, the draw bolts coupling the T-box housing inlet to the shroud inner surface and the downcomer elbow to the shroud outer surface.

In another aspect, a bracket assembly is provided for a core spray sparger in a nuclear reactor pressure vessel, the bracket assembly including a shroud, a core spray line, a fitted spacer, a draw bolt, a spherical washer, and a spherical nut. The shroud includes an inner face, an outer face, and a shroud bolt opening, the shroud bolt opening including a counterbore in the shroud inner face. The a core spray line includes a mounting bracket, the mounting bracket including a bolt receiver. The fitted spacer is sized to be received in the counterbore. The draw bolt includes an operating head, a bolt shaft extending from the operating head, a shaft periphery, and a plurality of scallops in the bolt shaft periphery. The bolt shaft includes a threaded section. The spherical washer includes a spherical cavity. The spherical nut includes a bolt keeper configured to be crimped to the shaft scallops, a spherical portion sized to be received in the spherical washer, the spherical nut maintaining compressive tension on the fitted spacer.

In another aspect, an end clamp assembly is provided for a core spray line. The core spray line includes an end cap and a plurality of spray nozzles in a nuclear reactor pressure vessel. The end clamp assembly includes an upper sleeve, a lower sleeve, a stop pin, and a plurality of clamp bolts. The upper sleeve includes an outer surface and at least one flange portion, each flange portion including a bolt opening. The lower sleeve is configured to couple to the upper sleeve and includes an outer surface, at least one bolt receiver, a stop pin opening and an end portion extending substantially perpendicularly from the lower sleeve. The stop pin extends through the lower sleeve stop pin opening into the core spray line. The clamp bolts extend through the upper sleeve flange portion to engage the lower sleeve bolt receiver, the lower sleeve end portion in contact with the sparger spray line end cap.

In another aspect, a core spray sparger in a nuclear reactor pressure vessel is provided. The core spray sparger includes a plurality of core spray lines, a coupling apparatus, a bracket assembly, and an end clamp assembly.

DETAILED DESCRIPTION

Figure 1:
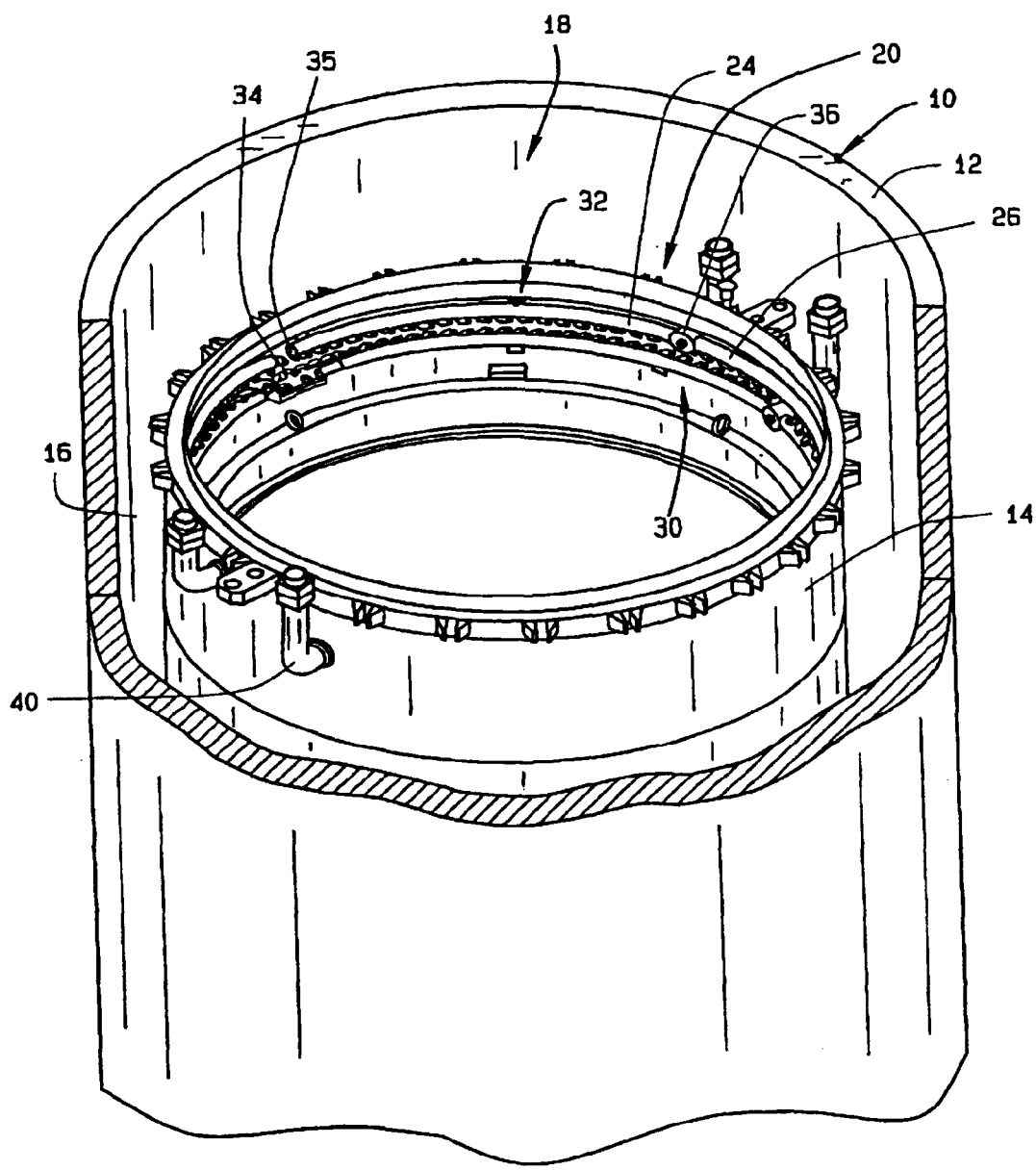
FIG. 1 is a perspective view, with parts cut away, of a boiling water reactor pressure vessel.

FIG. 1 is a perspective view, with parts cut away, of a boiling water reactor pressure vessel 10. Reactor pressure vessel 10 includes a vessel wall 12 and a shroud 14 that surrounds the reactor core (not shown) of pressure vessel 10. An annulus 16 is formed between vessel wall 12 and shroud 14. The space inside annulus 16 is limited because reactor support piping is located inside annulus 16.

Cooling water is delivered to the reactor core during a loss of coolant accident through a core spray system 18. Core spray system 18 includes a core spray sparger 20 located within pressure vessel 10. In some know reactors core spray system 18 includes multiple identical (or mirror image) spargers 20 for redundancy to ensure cooling water can be provided to the reactor core. For simplicity only one sparger 20 will be discussed. Core spray sparger 20 includes a plurality of core spray lines 24 and 26 located within shroud 14, a coupling apparatus 30, at least one bracket assembly 32, and at least one end clamp assembly 34. Each core spray line 24 and 26 extends from coupling apparatus 30 to an end cap 35. Each core spray line 24 and 26 is supported by at least one bracket assemblt 32.

Figure 2:
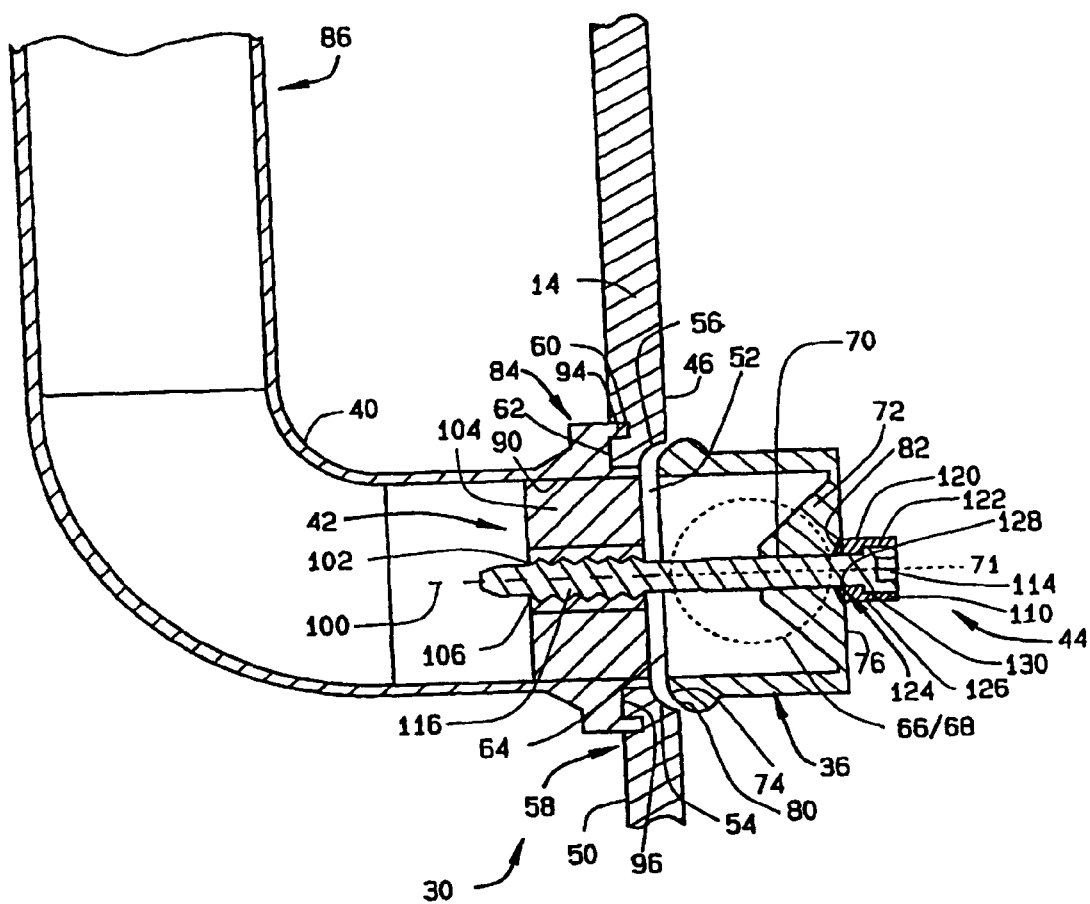
FIG. 2 is a side, schematic, cross-section view of a coupling apparatus.

FIG. 2 is a side, schematic, cross-section view of coupling apparatus 30. Coupling apparatus 30 includes shroud 14, a T-box housing 36, a downcomer elbow 40, a spider 42, and a draw bolt 44. T-box housing 36 and downcomer elbow 40 are mounted to shroud 1 4 by spider 42 and draw bolt 44.

Shroud 14 including an inner surface 46, an outer surface 50, a shroud opening 52 extending between inner surface 46 and outer surface 50. Shroud 14 also includes a shroud inner face seating surface 54 adjacent shroud opening 52 and a shroud outer face seat 56 adjacent shroud opening 52. Shroud inner face seating surface 54 is machined in shroud inner surface 46 to provide a specified seating configuration for T-box housing 36. Shroud inner face seating surface 54 is a concave or spherical seating surface 58 immediately adjacent to shroud opening 52. In another embodiment, shroud inner face seating surface 54 is flat tapered into shroud opening 52. Shroud outer face seat 56 includes a mounting groove 60 adjacent a machined lip 62 immediately adjacent shroud opening 52.

Figure 3:
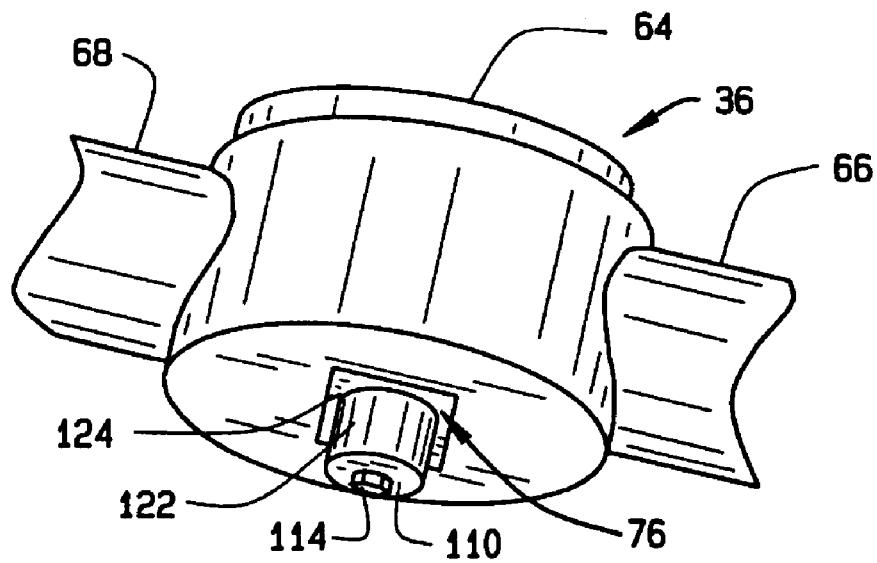
FIG. 3 is a perspective schematic view of a T-box housing of the coupling apparatus of FIG. 2.

FIG. 3 is a perspective schematic view of T-box housing 36. Referring to FIGS. 2 and 3, T-box housing 36 includes an inlet 64, a first outlet 66, a second outlet 68, a bolt opening 70 opposed inlet 64, and a central axis 71 extending from inlet 64 through bolt opening 70. First outlet 66 and second outlet 68 are generally opposed, each oriented about 90 degrees from inlet 64. First outlet 66 and second outlet 68 are configured to couple to core spray lines 24 and 26 (shown in FIG. 1) respectively. A cone-shaped fluid deflector 72 is positioned between first outlet 66 and second outlet 68. Bolt opening 70 extend through T-box housing 36 and fluid deflector 72 opposite inlet 64.

T-box housing 36 further includes an inlet seating surface 74 and a non-circular counterbore 76 adjacent bolt-opening 70. Inlet seating surface 74 includes a T-box spherical seat 80 sized to engage shroud inner face spherical seating surface 58. In another embodiment, inlet seating surface 74 includes a T-box spherical seat 80 sized to seat on flat tapered shroud inner face seating surface 54. Counterbore 76 is a larger bore adjacent bolt opening 70 that does not extend through T-box housing 36. Counterbore 76 is non-circular about central axis 71 and includes a spherical bottom 82. In an exemplary embodiment, counterbore 76 is square about central axis 71.

Figure 4:
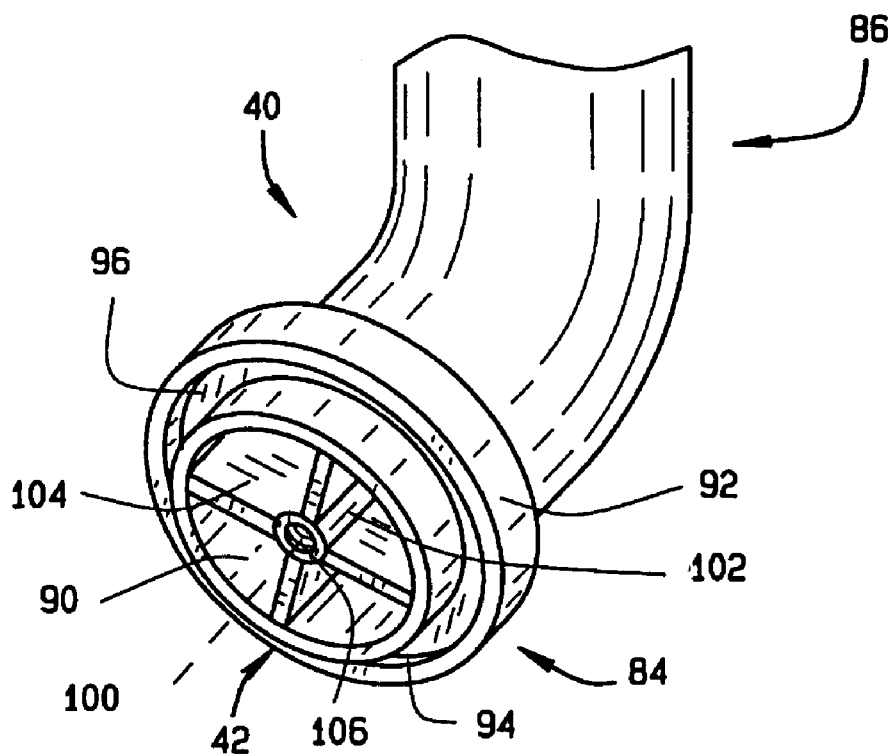
FIG. 4 is a perspective schematic view of a downcomer elbow of the coupling apparatus shown in FIG. 2.

FIG. 4 is a perspective schematic view of downcomer elbow 40. Referring to FIGS. 2 and 4, downcomer elbow 40 includes a first end 84 and a second end 86. First end 84 includes an interior portion 90 and an exterior portion 92. Downcomer elbow first end 84 includes a circumferential downcomer tongue 94 extending from first end 84 and a circumferential downcomer seat 96. Downcomer tongue 94 is substantially parallel central axis 71 and is sized to be received in mounting groove 60. Downcomer seat 96 is substantially perpendicular to central axis 71 and is sized to mate to outer shroud machined lip 62.

Spider 42 is attached to downcomer elbow first end 84, extending across interior portion 90. Spider 42 includes a spider central axis 100, a central hub 102 and a plurality of web members 104 extending radially from central hub 102. Central hub 102 includes a threaded interior 106. Web members 104 are configured to minimize flow resistance and block only a small percentage of downcomer elbow interior portion 90. In one embodiment, web members 104 are contoured to minimize flow resistance. Spider central axis 100 is substantially collinear with central axis 71. In an exemplary embodiment, spider 42 is cast as an integral part of downcomer elbow 40. In another embodiment spider 42 is welded to downcomer elbow 40. In still another embodiment spider 42 is threadedly engaged with downcomer elbow 40.

Draw bolt 44 includes a bolt head 110 including an operator portion 114, a threaded shaft 116 extending from bolt head 110, and a spherical washer 120. Spherical washer 120 includes a bolt keeper 122, a washer spherical base 124, and a head receiver 126 sized to receive bolt head 110. Bolt keeper 122 is configured to be crimped to bolt head 110. In one embodiment, bolt head 110 includes periphery scallops 130 to enhance engagement with bolt keeper 122. Operator portion 114 is sized to receive an installation tool (not shown). Spherical base 124 includes a concave or spherical end 128 and is radially non-circular. In the exemplary embodiment, spherical base 124 is radially square with spherical end 128, sized to be received in counterbore bottom 82. Draw bolt 44 extends through T-box housing bolt opening 70, T-box housing inlet 64, and shroud opening 52 to engage spider 42. More specifically, spherical end 128 engages T-box housing counterbore bottom 82 while draw bolt 44 threaded shaft 11 6 engages spider central hub threaded interior 106. Draw bolt 44 couples T-box housing 64 to shroud inner surface 46 at inlet seating surface 74 and shroud inner face seating surface 54. Draw bolt 44 also couples downcomer elbow 40 to shroud outer surface 50 with downcomer tongue 94 received in shroud mounting groove 60.

Figure 5:
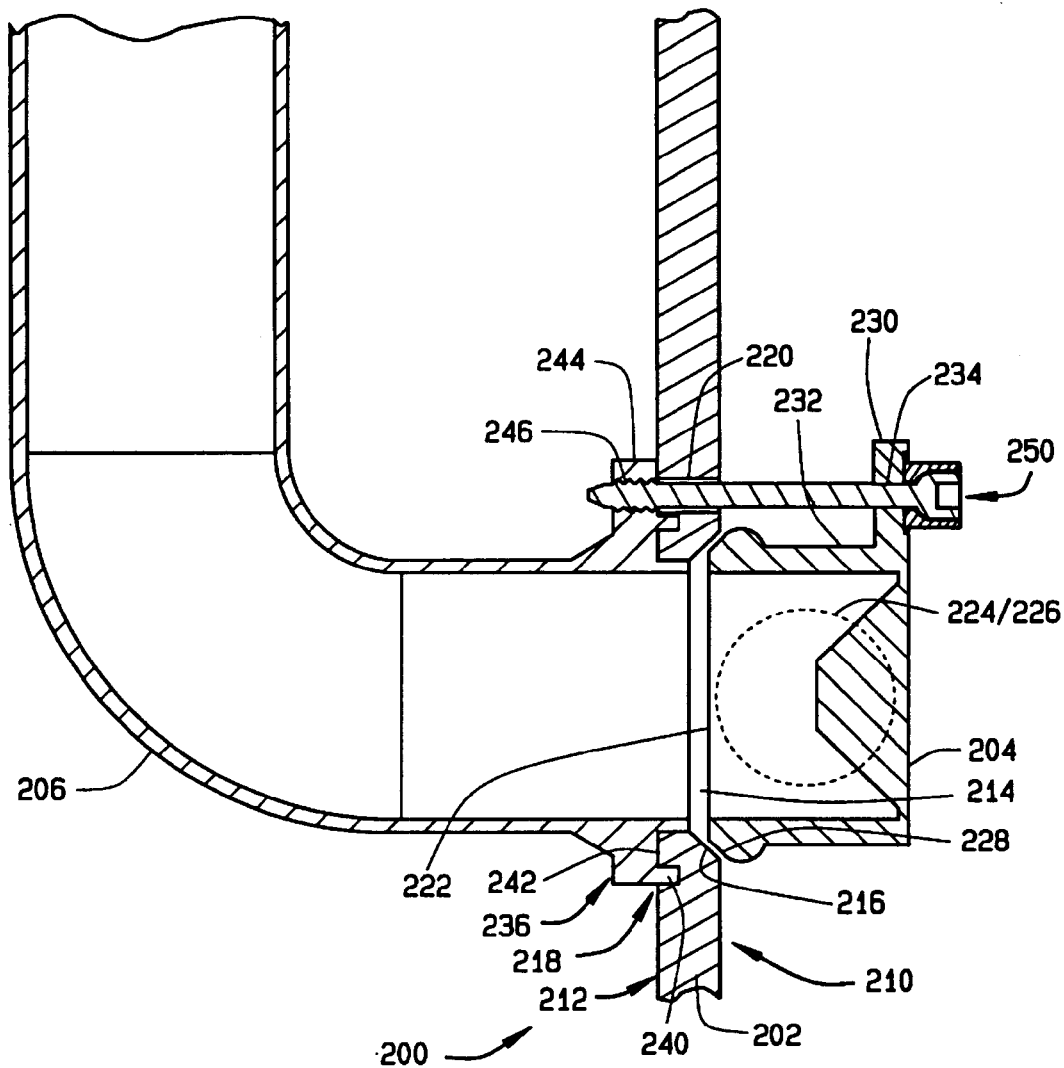
FIG. 5 is a side, schematic, cross-section view of an another embodiment of a coupling apparatus.

FIG. 5 is a side, schematic, cross-section view of a coupling apparatus 200 in accordance with another embodiment. Coupling apparatus 200 includes a shroud 202, a T-box housing 204, and a downcomer elbow 206. Similar to shroud 14 described above, shroud 202 includes an inner surface 210, an outer surface 212, a shroud opening 214 extending between inner surface 210 and outer surface 212, a shroud inner face seating surface 216 adjacent shroud opening 214, and a shroud outer face seat 218 adjacent shroud opening 214. Shroud 202 also includes a plurality of bolt openings 220 adjacent shroud opening 214.

T-box housing 204, similar to T-box housing 36 described above, includes an inlet 222, a first outlet 224, a second outlet 226, and an inlet seating surface 228. T-box housing 204 also includes a plurality of sidebrackets 230 (one shown) extending from a T-box exterior surface 232. Each sidebracket 230 includes a bolt opening 234. Sidebracket bolt openings 234 are substantially aligned with shroud bolt openings 220.

Downcomer elbow 206 includes a first end 236, a circumferential downcomer tongue 240 extending from first end 236, and a circumferential downcomer seat 242. Downcomer elbow 206 also includes a mounting flange 244 and a plurality of flange bolt receivers 246. Flange bolt receivers 246 are substantially aligned with shroud bolt openings 220 and sidebrackets bolt opening 234.

Coupling apparatus 200 includes a plurality of draw bolts 250 (one shown), which are substantially identical to draw bolts 44 described above. Draw bolts 250 extend through T-box housing sidebrackets bolt openings 232 and shroud bolt openings 220 to engage downcomer mounting flange bolt receivers 246. Draw bolts 250 couple T-box housing inlet 222 to shroud inner surface 210 and downcomer elbow 206 to shroud outer surface 212. More specifically, draw bolts 250 couple T-box inlet seating surface 228 to shroud inner face seating surface 216, and downcomer tongue 240 and downcomer seat 242 to shroud outer face seat 218.

Figure 6:
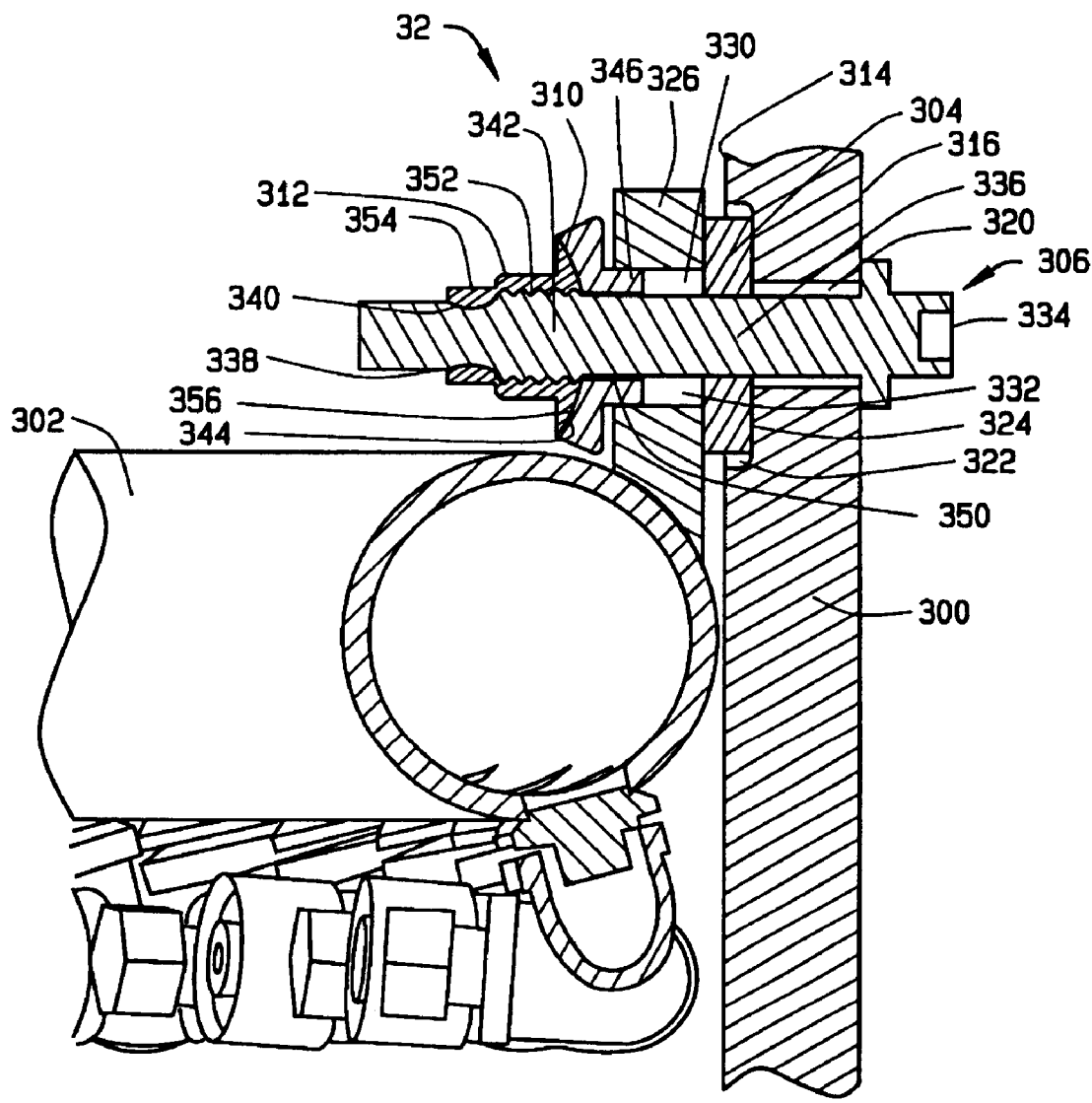
FIG. 6 is a side schematic view of a bracket assembly shown in FIG. 1.

FIG. 6 is a side schematic view of bracket assembly 32 of core spray sparger 20 shown in FIG. 1. Bracket assembly 32 includes a shroud 300, a core spray line 302, a fitted spacer 304, a draw bolt 306, a spherical washer 310, and a spherical nut 312. Bracket assembly 32 is coupled to a shroud 300. Shroud 300 is substantially similar to previously described shroud 14 or shroud 202, and core spray line 302 is substantially similar to previously described core spray lines 24 and 26. Shroud 300 includes an inner face 314, an outer face 316, and a shroud bolt opening 320. Shroud bolt opening 320 extends through shroud 300 from inner face 314 to outer face 316. Shroud bolt opening 320 includes a counterbore 322 in shroud inner face 314. Counterbore 322 extends circumferentially around bolt opening 320 and includes a substantially flat counterbore bottom 324 that is substantially perpendicular to shroud bolt-opening 320. Fitted spacer 304 is sized to be received in counterbore 322. Fitted spacer 304 is precisely machined and field fitted to provide the desired positioning of core spray line 302.

Core spray line 302 includes a mounting bracket 326, mounting bracket 326 including a bolt receiver 330. In an exemplary embodiment, mounting bracket 326 is cast as a single unit with core spray line 302. In another embodiment, mounting bracket 326 is welded to core spray line 302. Bolt receiver 330 extends through mounting bracket 326. In an exemplary embodiment, bolt receiver 330 is a slot 332. to facilitate thermal expansion and reduce associated stress.

Draw bolt 306 includes an operating head 334, a bolt shaft 336 extending from operating head 334, a shaft periphery 338, and a plurality of scallops 340 in bolt shaft periphery 338. Bolt shaft 336 includes a threaded section 342. Operating head 334 is sized to receive an installation tool (not shown).

Spherical washer 310 includes a spherical cavity 344 and a boss 346 sized to extend into bolt receiver 330. Spherical washer 310 also includes a center opening 350 sized to allow passage of draw bolt shaft 336. Center opening 350 extends through spherical washer 310, including spherical cavity 344 and boss 346. Spherical nut 312 includes a threaded center opening 352, a bolt keeper 354, and a spherical portion 356. Threaded center opening 352 is sized to receive and retain draw bolt threaded section 342. Bolt keeper 354 is configured to be crimped to shaft periphery 338 to maintain spherical nut 312 in position relative to draw bolt 306. More specifically, bolt keeper 354 is configured to be crimped to bolt shaft scallops 340. Spherical portion 356 is sized to be received in spherical washer 310. More specifically, washer spherical cavity 344 receives nut spherical portion 356, maintaining compressive tension on fitted spacer 304 while accommodating minor misalignment.

Figure 7:
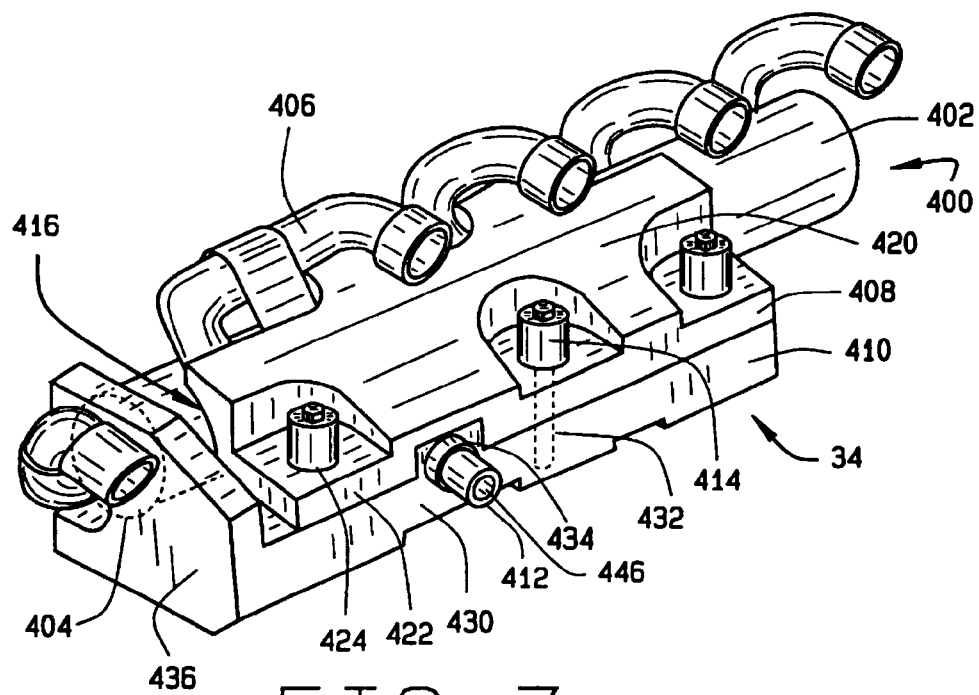
FIG. 7 is a perspective schematic view of an end clamp assembly shown in FIG. 1.
Figure 8:
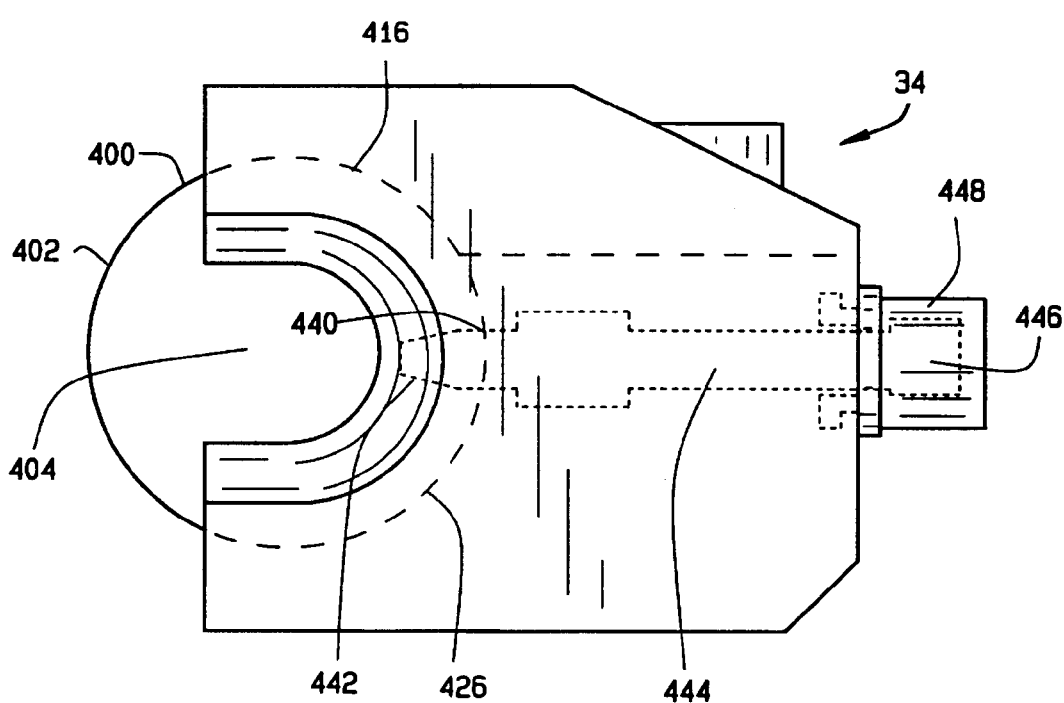
FIG. 8 is an end schematic view of an end clamp assembly shown in FIG. 7 with parts removed.

FIG. 7 is a perspective, schematic view of end clamp assembly 34 and FIG. 8 is an end schematic view of an end clamp assembly 34 with parts removed. Referring to FIGS. 7 and 8, end clamp assembly 34 includes a core spray line 400, a cylindrical core spray line exterior 402, an end cap 404, and a plurality of spray nozzles 406. Core spray line 400 is substantially similar to previously described core spray lines 24 and 26. End clamp assembly 34 further includes an upper sleeve 408, a lower sleeve 410, a stop pin 412, and a plurality of clamp bolts 414. Upper sleeve 408 includes an inner surface 416, an outer surface 420, and at least one flange portion 422, each flange portion 422 including a bolt opening 424. Upper sleeve inner surface 416 is configured to conform to and contact core spray line 400. More specifically, upper sleeve inner surface 416 contacts core spray line exterior 402 between spray nozzles 406. Lower sleeve 410 is configured to couple to upper sleeve 408 and includes an inner surface 426, an outer surface 430, at least one bolt receiver 432, a stop pin opening 434 and an end portion 436 extending substantially perpendicularly from lower sleeve 410. Lower sleeve inner surface 426 conforms to and contacts core spray line 400. More specifically, together lower sleeve inner surface 426 and upper sleeve inner surface 416 contact more than half the circumference of core spray line exterior 402.

Stop pin 412 extends through lower sleeve stop pin opening 434 into core spray line 400. More specifically, stop pin 412 extends into a spray line pin opening 440 in core spray line 400. Stop pin 412 includes a tapered end 442, a stop pin shaft 444, stop pin head 446, and a pin keeper 448. Pin keeper 448 is attached to lower sleeve stop pin opening 434 and crimped to stop pin head 446 to retain stop pin 412.

Clamp bolts 414 extend through upper sleeve flange portion 422 to engage lower sleeve bolt receiver 432. Clamp bolts 414 are substantially similar to draw bolts 44 described previously. Together stop pin 412 and clamp bolts 414 maintain upper sleeve 408 and lower sleeve 410 stationary relative to core spray line 400. Lower sleeve end portion 436 is in contact with sparger spray line end cap 404. End clamp assembly 34 reinforces core spray line 400, and more specifically, cores spray line end cap 404.

To replace a core spray sparger components, such as coupling assemblies, and brackets, the existing components are removed or machined by any suitable method, for example, roll cutting, conventional underwater plasma arc cutting, and/or electric discharge machining (EDM). Shroud 14 is then prepared, usually by EDM, to receive and mate with the above described components including, for example, T-box housing 36, downcomer elbow 40, T-box housing 204, downcomer elbow 206, draw bolt 306, and fitted spacer 304. More specifically, shroud inner face seating surface 54 is machined by EDM to provide the desired seating configuration. Additionally, the shroud outer face seat 56 is also prepared.

Coupling apparatus 30 is used to connect core spray lines 24 and 26 to core spray system 18 outside shroud 14. T-box housing 36 is joined to core spray lines 24 and 26 using know pipe connections, including welding. Downcomer elbow 40 is positioned against shroud outer face 50, and downcomer tongue 94 is seated in shroud outer face mounting groove 60. T-box spherical seat 80 is then seated in shroud inner face seating surface 54. Draw bolt 44 is inserted through T-box housing bolt opening 70, T-box housing inlet 64, and shroud opening 52 to engage spider hub threaded interior 106. After draw bolt 44 has been tighten to the desired torque, bolt keeper 122 is crimped to engage periphery scallops 130 in bolt head 110. Bolt keeper 122, attached to and restrained by washer base 124 in non-circular counterbore 76, maintains draw bolt 44 fixed relative to T-box housing 36. Draw bolt 44, with spherical washer 120 seated in counterbore 76, T-box spherical seat 80 and shroud inner face seating surface 54 facilitate tolerance in aligning coupling apparatus 30. Downcomer elbow 40 and spider 42 mate to shroud 14 and not directly to T-box housing 36. Coupling apparatus 200 is assembled in a similar manner.

Bracket assembly 32 also requires preparation of shroud 300. In one embodiment shroud 300 is substantially similar to shroud 14. Shroud bolt opening 320 and counterbore 322 are machined by EDM to precise dimensions. Similarly, fitted spacer 304 is precisely dimensioned to position core spray line 302. Fitted spacer 304 is positioned in shroud counterbore 322. Core spray line 302, including mounting bracket 326 is positioned adjacent fitted spacer 304 such that slot 332 is aligned with shroud bolt opening 320. Draw bolt 306 is inserted through shroud bolt opening 320, fitted spacer 304, and slot 332. Spherical washer 310 is positioned on draw bolt 306 with boss 346 in slot 332. Spherical nut 312 engages shaft threaded section 342, seating spherical portion 356 in washer spherical cavity 344. When core spray line positioning is satisfactory and draw bolt 306 is at the desired torque, bolt keeper 354 is crimped to scallops 340 of shaft periphery 338 to maintain spherical nut fixed relative to draw bolt 306.

End clamp assembly 34 is positioned on core spray line 400 to reinforce spray line end cap 404. Core spray line 400, which is substantially similar to core spray line 24 or 26, is prepared by machining, for example by EDM. Spray line opening 440 is machined to precise dimensions. Lower sleeve 410, with pin keeper 448 attached, is positioned in contact with core spray line 400 such that end portion 436 is in contact with end cap 404 and such that stop pin opening 434 is aligned with spray line pin opening 440. Upper sleeve 408 is position in contact with core spray line 400 and with lower sleeve 410. Clamp bolts 414 are installed and torqued to the desired tightness. Stop pin 412 is installed and pin keeper 448 is crimped to maintain stop pin 412 fixed relative to end clamp assembly 34. Stop pin 412 facilitates maintaining end clamp assembly 34 fixed relative to core spray line 400.

While the invention has been described in terms of various specific embodiments, those skilled in the art will recognize that the invention can be practiced with modification within the spirit and scope of the claims.

What is claimed is:

1. A coupling apparatus for a core spray system in a nuclear reactor pressure vessel, said coupling apparatus comprising:
    a shroud comprising an inner surface, an outer surface, and a shroud opening extending between said inner surface and said outer surface;
    a T-box housing having an inlet, a first outlet, a second outlet, and a bolt opening opposed said inlet;
    a downcomer elbow having a first end and a second end, said first end having an interior portion and an exterior portion;
    a spider attached to said downcomer elbow first end interior portion; and
    a draw bolt extending through said T-box housing bolt opening, said T-box housing inlet, and said shroud opening to engage said spider, said draw bolt coupling said T-box housing inlet to said shroud inner surface and coupling said downcomer elbow to said shroud outer surface.

2. A coupling apparatus in accordance with claim 1 wherein said T-box housing inlet comprises a seating surface.

3. A coupling apparatus in accordance with claim 2 wherein said T-box housing inlet seating surface comprises a spherical seat.

4. A coupling apparatus in accordance with claim 3 wherein said shroud inner surface comprises a seating surface adjacent said shroud opening.

5. A coupling apparatus in accordance with claim 4 wherein said shroud inner surface seating surface comprises a spherical seating surface sized to receive to said T-box housing inlet spherical seat.

6. A coupling apparatus in accordance with claim 1 wherein said shroud outer surface comprises a outer shroud seating surface adjacent said shroud opening.

7. A coupling apparatus in accordance with claim 6 wherein said downcomer elbow first end comprises a tongue, said outer shroud seating surface comprises a spot face and a mounting groove sized to receive said tongue.

8. A coupling apparatus in accordance with claim 1 wherein said spider comprises a central axis, a threaded hub and a plurality of web members extending radially from said threaded hub.

9. A coupling apparatus in accordance with claim 8 wherein said spider is configured to minimize flow resistance.

10. A coupling apparatus in accordance with claim 1 wherein said draw bolt comprises:
    a bolt head including an operator portion;
    a threaded shaft extending from said bolt head and sized to threadedly engage said spider; and
    a spherical washer including a bolt keeper, a non-circular washer base including a spherical end, and a bolt receiver sized to receive said bolt head, said bolt keeper configured to be crimped to said bolt head.

11. A coupling apparatus in accordance with claim 10 wherein said draw bolt further comprises circumferencial scallops in said bolt head periphery, said circumferencial scallops configured to engage said bolt keeper.

12. A coupling apparatus in accordance with claim 10 wherein said T-box further comprises a non-circular counterbore adjacent sized to receive and restrain said washer base.

13. A coupling apparatus for a core spray system in a nuclear reactor pressure vessel, said coupling apparatus comprising:
    a shroud comprising an inner face, an outer face, a shroud opening extending between said inner face and said outer face, a shroud inner face spherical seating surface adjacent said shroud opening, and a shroud outer face and a mounting groove adjacent said shroud opening;
    a T-box housing having an inlet, a first outlet, a second outlet, and a bolt opening opposed said inlet, an inlet seating surface comprising a T-box spherical seat sized to engage said shroud inner face spherical seating surface, and a non-circular counterbore adjacent said bolt opening;

a downcomer elbow having a first end and a second end, said first end having an interior portion and an exterior portion, said downcomer elbow first end further including a tongue sized to be received in said mounting groove;

a spider attached to said downcomer elbow first end interior portion, said spider configured to minimize flow resistance comprising a central axis, a threaded hub and a plurality of web members extending radially from said threaded hub; and a draw bolt comprising a bolt head including an operator portion, a threaded shaft extending from said bolt head, and a spherical washer including a bolt keeper, a washer base including a spherical end, and a bolt receiver sized to receive said bolt head, said bolt keeper configured to be crimped to said bolt head, said draw bolt extending through said T-box housing bolt opening, said T-box housing inlet, and said shroud opening to engage said spider, said draw bolt coupling said T-box housing inlet to said shroud inner surface and coupling said downcomer elbow to said shroud outer surface.

14. A coupling apparatus for a core spray system in a nuclear reactor pressure vessel, said coupling apparatus comprising:

a shroud comprising an inner surface, an outer surface, a shroud opening extending between said inner surface and said outer surface, and a plurality of bolt openings adjacent said shroud opening;

a T-box housing having an inlet, a first outlet, a second outlet, a plurality of sidebrackets, and bolt openings in said sidebrackets;

a downcomer elbow including a mounting flange and a plurality of flange bolt receivers; and a plurality of draw bolts extending through said T-box housing sidebrackets and said shroud bolt openings to engage said downcomer mounting flange bolt receivers, said draw bolts-coupling said T-box housing inlet to said shroud inner surface and said downcomer elbow to said shroud outer surface.

15. A coupling apparatus in accordance with claim 14 wherein said T-box housing inlet comprises a seating surface.

16. A coupling apparatus in accordance with claim 15 wherein said T-box housing inlet seating surface comprises a spherical seat.

17. A coupling apparatus in accordance with claim 16 wherein said shroud inner surface comprises a seating surface adjacent said shroud opening.

18. A coupling apparatus in accordance with claim 17 wherein said shroud inner surface seating surface comprises a spherical seating surface complimentary to said T-box housing inlet spherical seat.

19. A coupling apparatus in accordance with claim 14 wherein said shroud outer surface comprises a outer shroud seating surface adjacent said shroud opening.

20. A coupling apparatus in accordance with claim 19 wherein said downcomer elbow mounting flange comprises a tongue, said outer shroud seating surface comprises a face and a mounting groove sized to receive said tongue.

21. A coupling apparatus in accordance with claim 14 wherein said draw bolt comprises:

a bolt head including an operator portion;

a threaded shaft extending from said bolt head and configured to couple to said flange bolt receivers; and a spherical washer including a bolt keeper, a non-circular washer base including a spherical end, and a bolt receiver sized to receive said bolt head, said bolt keeper configured to be crimped to said bolt head.

22. A coupling apparatus in accordance with claim 21 wherein said draw bolt further comprises circumferencial scallops in said bolt head periphery, said circumferencial scallops configured to engage said bolt keeper.

23. A coupling apparatus in accordance with claim 21 wherein said T-box sidebrackets comprise a non-circular counterbore adjacent said bolt opening sized to receive and restrain said washer base.

24. A bracket assembly for a core spray sparger in a nuclear reactor pressure vessel, said bracket assembly comprising:

a shroud comprising an inner face, an outer face, and a shroud bolt opening, said shroud bolt opening including a counterbore in said shroud inner face;

a core spray sparger comprising a mounting bracket, said mounting bracket including a bolt receiver;

a fitted spacer sized to be received in said counterbore;

a draw bolt comprising an operating head, a bolt shaft extending from said operating head, said bolt shaft including a threaded section, a shaft periphery and a plurality of scallops in said bolt shaft periphery;

a spherical washer comprising a spherical cavity; and a spherical nut comprising a bolt keeper configured to be crimped to said shaft scallops, and a spherical portion sized to be received in said spherical washer, said spherical nut maintaining compressive tension on said fitted spacer.

25. A bracket assembly in accordance with claim 24 wherein said bolt receiver comprises bracket slots.

26. A bracket assembly in accordance with claim 24 wherein said spherical washer comprises a boss extending opposite said spherical cavity into said bolt receiver.

27. An end clamp assembly for a core spray line including an end cap and a plurality of spray nozzles in a nuclear reactor pressure vessel, said end clamp assembly comprising:

an upper sleeve comprising an outer surface and at least one flange portion, each flange portion including a bolt opening;

a lower sleeve configured to couple to said upper sleeve, said lower sleeve comprising an outer surface, at least one bolt receiver, a stop pin opening and an end portion extending substantially perpendicularly from said lower sleeve;

a stop pin extending through said lower sleeve stop pin opening into the core spray line; and a plurality of clamp bolts, said clamp bolts extending through said upper sleeve flange portion to engage said lower sleeve bolt receiver, said lower sleeve end portion in contact with the core spray line end cap.

28. A core spray sparger in a nuclear reactor pressure vessel, said core spray sparger comprising:

a plurality of core spray lines including a core spray line end cap;

a coupling apparatus;

a bracket assembly; and an end clamp assembly, said coupling apparatus comprising:

a shroud comprising an inner surface, an outer surface, and a shroud opening extending between said inner surface and said outer surface, a T-box housing comprising an inlet, a first outlet, a second outlet, and a bolt opening opposed said inlet, said first outlet connected to a core spray line, said second outlet connected to a core spray line, a downcomer elbow comprising a first end and a second end, said first end having an interior portion and an exterior portion, a spider attached to said downcomer elbow first end interior portion, and a draw bolt extending through said T-box housing bolt opening, said T-box housing inlet, and said shroud opening to engage said spider, said draw bolt coupling said T-box housing inlet to said shroud inner surface and coupling said downcomer elbow to said shroud outer surface, said bracket assembly comprising:

said shroud further comprising a shroud bolt opening, said shroud bolt opening including a counterbore in said shroud inner face, a mounting bracket coupled to said core spray line, said mounting bracket including a bolt receiver, a fitted spacer sized to be received in said counterbore, a sparger bolt comprising an operating head, a bolt shaft extending from said operating head, said bolt shaft including a threaded section, a shaft periphery and a plurality of scallops in said bolt shaft periphery, a spherical washer comprising a spherical cavity, and a spherical nut comprising a bolt keeper configured to be crimped to said shaft scallops, a spherical portion configured to be received in said spherical washer, said spherical nut maintaining compressive tension on said fitted spacer, and said end clamp assembly comprising:

an upper sleeve including an outer surface and at least one flange portion, each flange portion including a bolt opening, a lower sleeve configured to couple to said upper sleeve, said lower sleeve including an outer surface, at least one bolt receiver, a stop pin opening and an end portion extending substantially perpendicularly from said lower sleeve, a stop pin extending through said lower sleeve stop pin opening into said core spray line, and a plurality of clamp bolts, said clamp bolts extending through said upper sleeve flange portion to engage said lower sleeve bolt receiver, said lower sleeve end portion in contact with said core spray line end cap.

\* \* \* \* \*